(12) United States Patent
Sarawate

(10) Patent No.: US 10,436,041 B2
(45) Date of Patent: Oct. 8, 2019

(54) SHROUD ASSEMBLY FOR TURBINE SYSTEMS

(71) Applicant: General Electric Company, Schenectady, NY (US)

(72) Inventor: Neelesh Nandkumar Sarawate, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 202 days.

(21) Appl. No.: 15/481,674

(22) Filed: Apr. 7, 2017

(65) Prior Publication Data

US 2018/0291749 A1    Oct. 11, 2018

(51) Int. Cl.
| | | |
|---|---|---|
| *F01D 5/22* | (2006.01) | |
| *F01D 11/00* | (2006.01) | |
| *F01D 5/34* | (2006.01) | |

(52) U.S. Cl.
CPC ............... *F01D 5/225* (2013.01); *F01D 5/34* (2013.01); *F01D 11/006* (2013.01); *F01D 11/008* (2013.01); *F05D 2240/81* (2013.01); *F05D 2260/201* (2013.01); *Y02T 50/672* (2013.01); *Y02T 50/676* (2013.01)

(58) Field of Classification Search
CPC ...... F01D 5/225; F01D 11/006; F01D 11/008; F05D 2240/80; F05D 2240/81; F05D 2260/201
USPC ..... 415/135, 138, 139; 416/190, 191, 193 R, 416/193 A, 194, 195, 196 R
See application file for complete search history.

(56) References Cited

U.S. PATENT DOCUMENTS

| | | | | |
|---|---|---|---|---|
| 3,728,041 A | * | 4/1973 | Bertelson | ............... F01D 9/042 415/189 |
| 3,986,789 A | * | 10/1976 | Pask | ....................... F01D 5/187 415/178 |
| 4,668,164 A | * | 5/1987 | Neal | ....................... F01D 9/041 415/116 |
| 5,927,942 A | | 7/1999 | Stahl et al. | |
| 6,354,795 B1 | | 3/2002 | White et al. | |

(Continued)

FOREIGN PATENT DOCUMENTS

EP    1124039 A1    8/2001

OTHER PUBLICATIONS

Porreca et al., "Aerothermal Optimization of Partially Shrouded Axial Turbines", Swiss federal Institute of technology zurich, 2007, pp. 1-7.

*Primary Examiner* — Christopher Verdier
(74) *Attorney, Agent, or Firm* — Dority & Manning, P.A.

(57) ABSTRACT

A shroud assembly of a turbine system is presented. The shroud assembly includes a plurality of outer shroud segments disposed annularly and defining a first gap between a pair of outer shroud segments of the plurality of outer shroud segments; a plurality of inner shroud segments disposed annularly and radially inward of the plurality of outer shroud segments, and defining a second gap between a pair of inner shroud segments of the plurality of inner shroud segments, wherein the plurality of inner shroud segments is same in number to the plurality of outer shroud segments, and wherein the first gap and the second gap are offset; and an impingement plate coupled to an outer shroud segment of the pair of outer shroud segments and interposed between the outer shroud segment and the pair of inner shroud segments.

10 Claims, 3 Drawing Sheets

(56) References Cited

U.S. PATENT DOCUMENTS

| | | |
|---|---|---|
| 6,425,738 B1 * | 7/2002 | Shaw .................. F01D 9/041 |
| | | 415/208.1 |
| 7,063,503 B2 | 6/2006 | Meisels |
| 7,217,089 B2 | 5/2007 | Durocher et al. |
| 9,022,733 B2 * | 5/2015 | Coupe ................ C04B 35/524 |
| | | 415/209.4 |
| 9,145,789 B2 | 9/2015 | Adavikolanu et al. |
| 9,500,095 B2 | 11/2016 | Pietrobon et al. |
| 2013/0175357 A1 * | 7/2013 | Winn ................ F01D 11/001 |
| | | 239/128 |
| 2013/0287546 A1 | 10/2013 | Lacy et al. |
| 2014/0064913 A1 | 3/2014 | Adavikolanu et al. |
| 2016/0251982 A1 | 9/2016 | Shapiro |
| 2016/0348535 A1 | 12/2016 | Dyson et al. |

\* cited by examiner

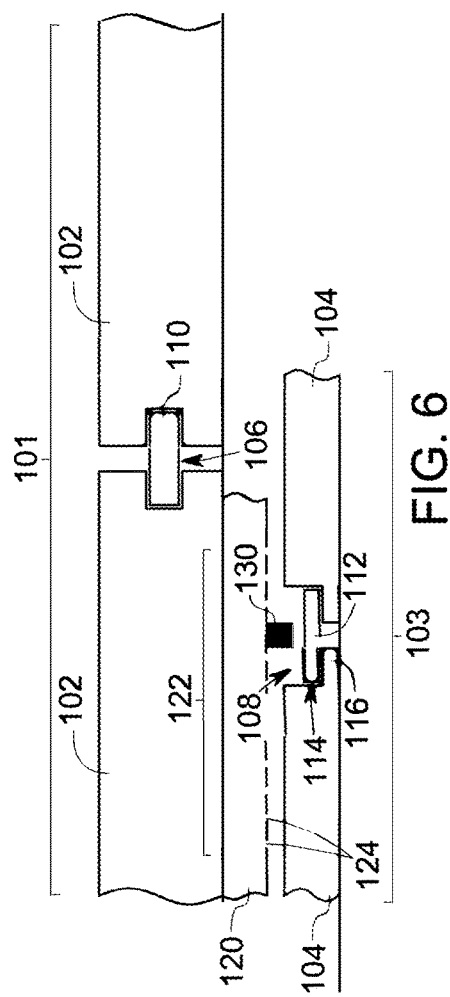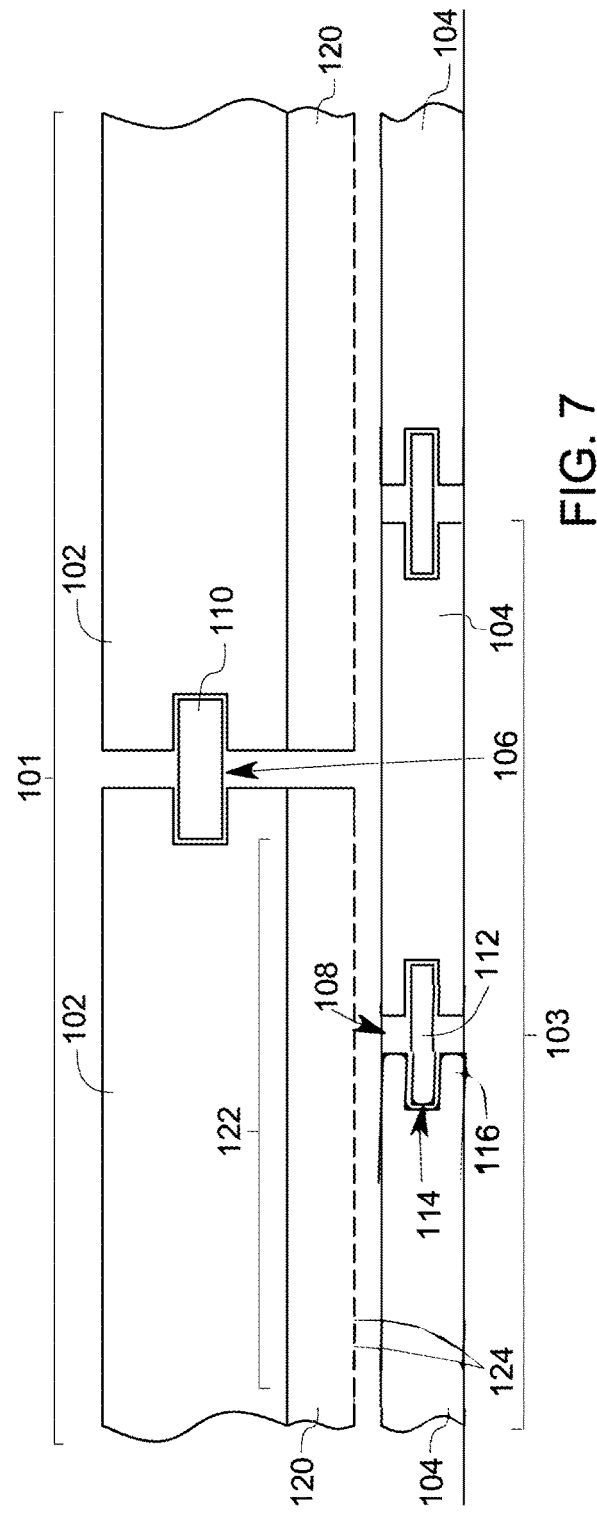

SHROUD ASSEMBLY FOR TURBINE SYSTEMS

Embodiments of the present disclosure generally relate to shroud assemblies for turbine systems. More particularly, embodiments of the present disclosure relate to shroud assemblies for improved cooling of components of the shroud assemblies such as sealing components.

BACKGROUND

In turbine systems, a combustor converts the chemical energy of a fuel or an air-fuel mixture into a thermal energy. The thermal energy is conveyed by a fluid, often compressed air from a compressor to a turbine where the thermal energy is converted to a mechanical energy. As part of the conversion process, hot combustion gases flow over and through portions of the turbine as a hot gas flow path. High temperatures along the hot gas flow path can heat several turbine components, which may be detrimental to the components. Turbine shrouds are an example of a component that is subjected to the hot gas flow path.

Overall efficiency and power of the turbine systems may be increased by increasing the firing temperature of the combustion gases. High efficiency turbine systems may have firing temperatures exceeding about 1500 degrees Celsius, and firing temperatures are expected to be higher than the current typically used firing temperatures as the demand for more efficient turbine systems continues. Components composed of ceramic matrix composite ("CMC") materials may be potentially more suitable to withstand and operate at higher temperatures as compared to that of the traditionally used metallic materials (for example, cobalt-based and nickel-based superalloys). Typical CMC materials incorporate ceramic fibers in a ceramic matrix for enhanced mechanical strength and ductility.

The overall efficiency of the turbine system may further be improved by preventing the parasitic losses caused due to the leakage of either the hot gases from the hot gas flow path or a cooling medium, for example cooling air, or mixing of a cooling medium with the hot gases. Sealing components such as spline seals may be used to seal the gaps between adjacent shroud segments of the turbine shroud to prevent such leakage and mixing. Current spline seals use many different combinations and configurations of metal shims and metal wire mesh.

Although the use of CMC materials for the shroud segments of the turbine shroud may reduce the cooling requirements in a turbine system, the metallic seal components between the shroud segments may face high heat fluxes and other operational parameters at high temperatures (for example, higher than 1000 degrees Celsius) that may lead to high oxidation, creep, and damage or failure because of insufficient cooling arrangements.

Therefore, there is a need for alternative configurations of shroud assemblies for providing improved cooling of several components such as sealing components of the shroud assemblies.

BRIEF DESCRIPTION

In one aspect provided herein is a shroud assembly of a turbine system. The shroud assembly includes a plurality of outer shroud segments disposed annularly and defining a first gap between a pair of outer shroud segments of the plurality of outer shroud segments; a plurality of inner shroud segments disposed annularly and radially inward of the plurality of outer shroud segments, and defining a second gap between a pair of inner shroud segments of the plurality of inner shroud segments, wherein the plurality of inner shroud segments is same in number to the plurality of outer shroud segments and wherein the first gap and the second gap are offset; and an impingement plate coupled to an outer shroud segment of the pair of outer shroud segments and interposed between the outer shroud segment and the pair of inner shroud segments. In another aspect, a turbine system including the shroud assembly as described herein is provided.

Another aspect provided herein is directed to a shroud assembly for a turbine system, which includes a plurality of outer shroud segments disposed annularly and defining a plurality of first gaps between each pair of outer shroud segments of the plurality of outer shroud segments; a plurality of inner shroud segments disposed annularly and radially inward of the plurality of outer shroud segments, and defining a plurality of second gaps between each pair of inner shroud segments of the plurality of inner shroud segments, wherein the plurality of first gaps and the plurality of second gaps are offset; and a plurality of impingement plates coupled to the plurality of outer shroud segments and interposed between the plurality of outer shroud segments and the plurality of inner shroud segments.

These and other features, embodiments, and advantages of the present disclosure may be understood more readily by reference to the following detailed description.

DRAWINGS

These and other features, aspects, and advantages of the present disclosure will become better understood when the following detailed description is read with reference to the accompanying drawings in which like characters represent like parts throughout the drawings, wherein:

FIG. 6 is a schematic cross-sectional view of a portion of a shroud assembly, in accordance with yet another embodiment of the disclosure; and FIG. 7 is a schematic cross-sectional view of a portion of a shroud assembly, in accordance with yet another embodiment of the disclosure.

DETAILED DESCRIPTION

Figure 1:
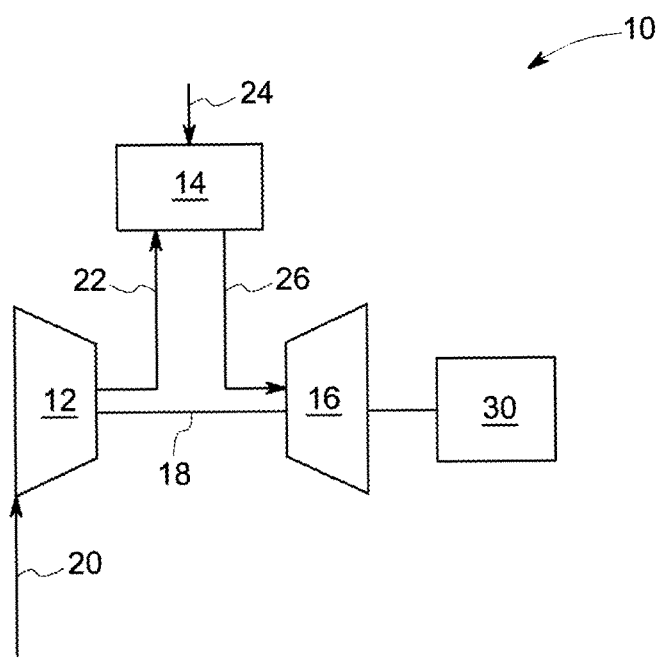
FIG. 1 is a schematic of a turbine system, in accordance with one embodiment of the disclosure.

Some embodiments of the present disclosure present a shroud assembly for a turbine system. The present configuration of the shroud assembly as described herein provides improved cooling for sealing components (for example, spline seals) between adjacent shroud segments, which are proximate to a hot gas flow path of the turbine system. Such configuration of shroud assemblies advantageously enable to operate the turbine systems at elevated temperatures because of improved cooling of the sealing components.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", is not limited to the precise value specified. In some instances, the approximating language may correspond to the precision of an instrument for measuring the value.

Unless defined otherwise, technical and scientific terms used herein have the same meaning as is commonly understood by one of skill in the art to which this disclosure belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another.

As used herein, the terms "high operating temperature", "high temperature" and "elevated temperature" refer to an operating temperature that is higher than 1000 degrees Celsius, of a turbine system. In some embodiments, the operating temperature is higher than 1200 degrees Celsius. In some embodiments, the operating temperature is higher than 1400 degrees Celsius.

In one embodiment, a shroud assembly for a turbine system, is presented. The shroud assembly includes a plurality of outer shroud segments, a plurality of inner shroud segments, and an impingement plate interposed between the plurality of outer shroud segments and the plurality of inner shroud segments. The plurality of outer shroud segments is disposed annularly and defines a first gap between a pair of outer shroud segments of the plurality of outer shroud segments. The plurality of inner shroud segments is disposed annularly and radially inward of the plurality of outer shroud segments, and defines a second gap between a pair of inner shroud segments of the plurality of inner shroud segments. The plurality of inner shroud segments is same in number to the plurality of outer shroud segments. The plurality of outer shroud segments and the plurality of inner shroud segments are arranged such that the first gap and the second gap are offset. In some embodiments, a first sealing component is disposed in the first gap. In some embodiments, a second sealing component is disposed in the second gap. In some embodiments, the impingement plate is coupled to an outer shroud segment of the pair of outer shroud segments. In these embodiments, the impingement plate is aligned to the second gap. That is, in some embodiments, the impingement plate is aligned to the second sealing component disposed in the second gap. This configuration improves the cooling of the second sealing component disposed in the second gap. The present disclosure also encompasses embodiments of a turbine system that includes a shroud assembly as described herein.

As used herein, the term "couple" or "coupling" refers to mechanically joining, fixing, or connecting two or more components in a shroud assembly of a turbine system. For example, an impingement plate may be joined or connected to an outer shroud segment using clamps, fixtures, bolts, welding, grooves or hooks provided in the outer shroud segment or combinations thereof.

FIG. 1 is a schematic diagram of a turbine system 10, for example an aircraft engine. The turbine system 10 may include a compressor 12, 4 combustor 14, and a turbine 16. The compressor 12 and turbine 16 may be coupled by a shaft 18. The shaft 18 may be a single shaft or a plurality of shaft segments coupled together to form shaft 18. The compressor 12 compresses an incoming flow of air 20 and deliver the compressed flow of air 22 to the combustor 14. The combustor 14 mixes the compressed flow of air 22 with a pressurized flow of fuel 24 and ignites the mixture to create a flow of high-temperature and high-pressure combustion gases 26. The flow of combustion gases 26 includes hot gases (usually at a temperature higher than 1000 degrees Celsius), and may also be referred to as a hot gas flow or hot gas flow path; these terms are used interchangeably throughout the specification. In some embodiments, the turbine system 10 may include a plurality of combustors 14. The high-temperature and high-pressure combustion gases 26 enter the turbine 16, where these expand down to the exhaust pressure, driving the turbine 16 and producing exhaust gases. The mechanical work produced in the turbine 16 drives the compressor 12 via the shaft 18 and may be used to drive an external load 30 such as an electrical generator.

Figure 2:
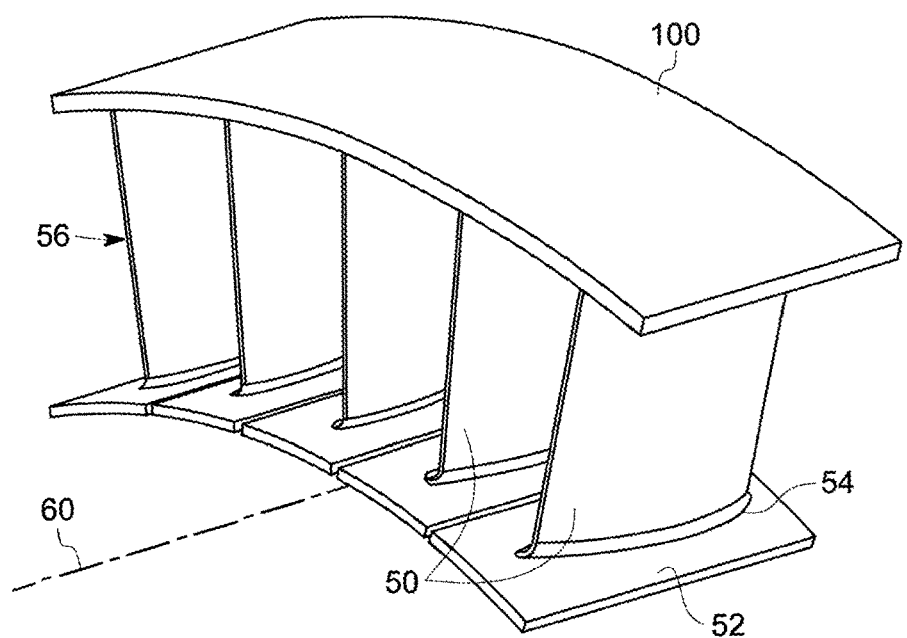
FIG. 2 is a schematic of a section of a turbine including a shroud assembly, in accordance with one embodiment of the disclosure.

FIG. 2 shows a schematic of a section of the turbine 16 including turbine blades 50 and shroud assembly 100. As illustrated, the turbine blades 50 are mounted on a turbine disk 52 for rotation at operating speeds. The turbine blades 50 may be positioned circumferentially about an axis 60. Each turbine blade 50 may include a root section 54 attached to the disk 52 and an airfoil section 56. Positioned on the top of the airfoil section 56 is the shroud assembly 100. The shroud assembly 100 is positioned substantially perpendicular to the turbine blades 50.

Figure 3:
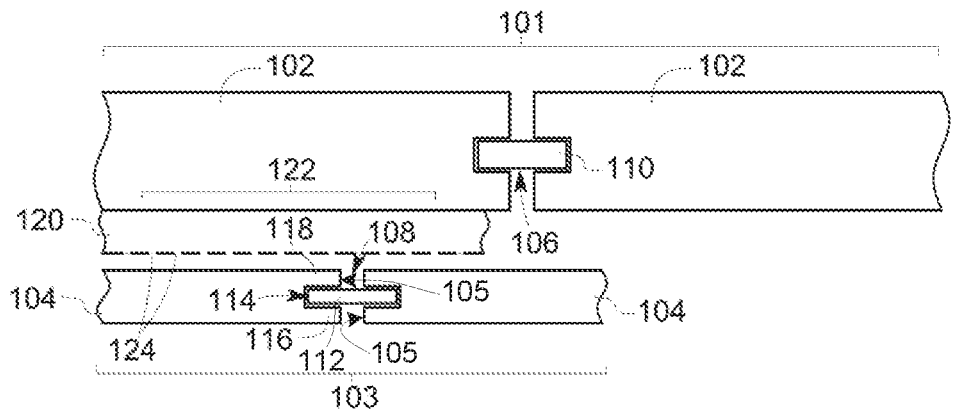
FIG. 3 is a schematic cross-sectional view of a portion of a shroud assembly, in accordance with one embodiment of the disclosure.

FIG. 3 schematically shows a cross sectional view of a portion of a shroud assembly 100 (FIG. 2) of the turbine 16 (FIG. 1), in some embodiments. The shroud assembly 100 includes a plurality of outer shroud segments 102, for example shroud hangers and a plurality of inner shroud segments 104. The plurality of outer shroud segments 102 are disposed annularly about the axis 60 (FIG. 2). In other words, the plurality of outer shroud segments 102 are arranged adjacent to one another to form an annular structure proximate to a casing (not shown in figures) of the turbine 16. The plurality of outer shroud segments 102 may be secured to the casing. The plurality of inner shroud segments 104 are disposed annularly about the axis 60 and radially inward of the plurality of outer shroud segments 102. In the shroud assembly 100, the plurality of inner shroud segments 104 is same in number to the plurality of outer shroud segments 102, in some embodiments. The outer shroud segments 102 may be provided with hooks and grooves at their leading and trailing edges for coupling an inner shroud segment 104 to one or more outer shroud segments 102.

Referring to FIGS. 1 and 2, in the turbine 16, the shroud assembly 100 may be subjected to a hot gas flow path as described previously. In use, a cooling fluid, for example air from the compressor may be used to cool the shroud assembly 100. Often, the plurality of inner shroud segments 104 is proximate to the hot gas flow path and the plurality of outer shroud segments 102 is proximate to the cooling fluid in the turbine 16.

Various materials may be used to form the plurality of outer shroud segments 102 and the plurality of inner shroud segments 104, depending on their surrounding thermal load (for example, the hot gas flow path or the cooling fluid). Non-limiting examples of suitable materials include a metallic material, a ceramic material, a composite material or combinations thereof. In some embodiments, the materials may be oxidation-resistant materials. Suitable metallic materials include various alloys or superalloys including nickel, iron, chromium or combinations thereof. Examples of suitable ceramic materials include silicon carbide, silicon nitride, alumina, yttria stabilized zirconia or combinations thereof. In specific embodiments, the plurality of outer shroud segments 102 are composed of a low-temperature-resistant material such as a low-temperature-resistant alloy. Suitable examples of the low-temperature resistant alloys include René alloy (for example, Renè 41, Renè 77), HASTELLOY or the likes.

In some embodiments, the plurality of inner shroud segments 104 being proximate to the hot gas flow path are composed of a high-temperature-resistant material. Examples of the high-temperature-resistant materials include an alloy such as a superalloy or a ceramic matrix composite. The high-temperature-resistant materials generally provide desirable strength, thermal and environmental stability, and ability to retain the mechanical integrity at high temperatures and during the thermal cycling operations of turbine systems. A high-temperature-resistant alloy typically includes a nickel-based, cobalt-based or iron-based superalloy characterized by desirable mechanical properties. Illustrative nickel-based and/or cobalt-based superalloys are designated by the trade names INCONEL (e.g., INCONEL 718), NIMONIC, René alloy (e.g., René 88, René 104 alloys), HAYNES, and UDIMET. In certain embodiments, the high-temperature-resistant material is a ceramic matrix composite. A particular example of the ceramic matrix composite is a material having a matrix of silicon carbide or silicon nitride, with a reinforcement phase of silicon carbide disposed within the matrix, often in the form of fibers. In specific embodiments, the plurality of inner shroud segments 104 are composed of a ceramic matrix composite.

Referring to FIG. 3, the plurality of outer shroud segments 102 defines a first gap 106 between a pair 101 of outer shroud segments 102. The first gap 106 may act as a channel for directing the cooling fluid into the shroud assembly 100. Similarly, the plurality of inner shroud segments 104 defines a second gap 108 between a pair 103 of the inner shroud segments 104. As illustrated, the plurality of outer shroud segments 102 and the plurality of inner shroud segments 104 in the shroud assembly 100 are arranged such as the first gap 106 and the second gap 108 are offset with each other. In some embodiments, the shroud assembly 100 includes a first sealing component 110 disposed in the first gap 106. In some embodiments, the shroud assembly 100 further includes a second sealing component 112 disposed in the second gap 108. The first and second sealing components (110, 112) block respectively the first gap 106 and the second gap 108 to prevent, or at least substantially reduce a leakage of the hot gas flow, the cooling fluid, or both, or mixing of the two thereof.

As illustrated, each inner shroud segment 104 of the pair 103 of the inner shroud segments 104 have a slot 114 defined by a first leg 116 and a second leg 118 at the edges (side surfaces) 105 facing each other in the annular arrangement of the plurality of inner shroud segments 104. The edges 105 of the two inner shroud segments 104 define the second gap 108. The first leg 116 and the second leg 118 protrude from the edge 105 of each inner shroud segment 104 as shown in FIG. 3. The second sealing component 112 is disposed in the second gap 108 extending from the slot 114 of one inner shroud segment 104 to the slot 114 of the adjacent inner shroud segments 104. The first and second legs 116 and 118 define the slot 114 and provide support to the second sealing component 112 disposed in the second gap 108.

Each sealing component (i.e., the first and second sealing components 110, 112) includes one or more shims that extend to a length of a joining interface of the pair 101 of the outer shroud segments 102 and/or the pair 103 of the inner shroud segments 104. As used herein, the term "shim" refers to a long rigid piece or bar of a material. Further, the term "shim" does not necessarily mean a uniform thickness, and the shim may have a uniform or a variable thickness. The shims may have any cross-sectional shape known in the art that may provide a seal between adjacent shroud segments. For example, in one embodiment, the first and second sealing components 110, 112 may have rectangular cross-sections, as shown in FIG. 3. The first and second sealing components 110, 112 may also be referred to as "spline seal."

With respect to materials, a material that can be formed into shims, may be used for the sealing components (110, 112). As noted previously, it may be desirable to use oxidation-resistant materials. The sealing components (110, 112) may include a metallic material, a ceramic material, a composite material or combinations thereof. In certain embodiments, the first sealing component 110, the second sealing component 112 or both include a shim composed of a metallic material (i.e., metallic shim). As the first sealing component 110 may not be exposed to the hot gas flow path, the first sealing component 110 may include any suitable material that has desirable mechanical properties and environmental stability in the cooling fluid. A low-temperature-resistant alloy as described previously may be a suitable material for the first sealing component 110. The second sealing component 112 being exposed to the high temperature environment of the hot gas flow path, may include a high-temperature-resistant material. Various high-temperature-resistant materials are described above. In some embodiments, the second sealing component 112 includes a high-temperature-resistant alloy. Non-limiting examples of the high-temperature-resistant alloys for the second sealing component 112 include nickel-based superalloys such as Haynes® 188, Haynes® 230, Haynes® 214 or combinations thereof.

The first and second sealing components 110, 112 may include one or more shims, that is a single shim or a plurality of shims. The first and second sealing components 110, 112 may have a thickness less than 5 millimeters. In some embodiments, the first and second sealing components 110, 112 have a thickness in a range of from about 0.1 millimeter to about 4 millimeters. The number of shims and their thicknesses for use in a sealing component may depend on an end use application. In embodiments where the first sealing component 110, the second sealing component 112 or both include a single shim, a thick shim for example, having a thickness more than 1 millimeter may be used. In embodiments where the first sealing component 110, the second sealing component 112 or both include a plurality of shims, thin shims having a thickness less than 1 millimeter may be used. The plurality of shims may be used in one or more stacks having multiple shims laid one over the other to have a total thickness of up to 5 millimeters. In some embodiments, each shim of the plurality of shims has a thickness in a range of from about 0.1 millimeter to about 1 millimeter. In some embodiments, a single thick shim may be desirable for relatively high mechanical properties as compared to the plurality of thin shims. In certain embodiments, the second sealing component 112 includes a single shim of a thickness in a range of from about 1 millimeter to about 5 millimeters. In some embodiments, the single shim of the second sealing component 112 has a thickness in a range of from about 2 millimeters to about 4 millimeters.

Also, contemplated within the scope of embodiments presented herein are embodiments wherein the one or more shims may include same or different materials for each shim.

In some embodiments, the second sealing component 112 further includes a protective coating disposed on a surface of one or more shims as described hereinabove. The protective coating may be disposed to protect the shim such as a metallic shim from high temperature, corrosive environment, and any contamination caused by or reaction with any adjacent component in the turbine systems. The protective coating may include an oxidation-resistant material such as metal aluminides, MCrAlY alloys, where NI represents a metal such as iron, nickel, platinum or cobalt, thermal barrier materials, or combinations thereof.

Referring to FIG. 3 again, the shroud assembly 100 further includes an impingement plate 120 interposed between the plurality of outer shroud segments 102 and the plurality of inner shroud segments 104. The impingement plate 120 may be coupled to an outer shroud segment 102 of the pair 101 of the outer shroud segments 102. The impingement plate 120 may extends to a length of the upper shroud segment 120, a length of the inner shroud segment 104 or a length of the second sealing component 112. The impingement plate 120 includes a cooling section 122 that includes a plurality of openings 124, for example holes. In the illustrated arrangement, the impingement plate 120 is positioned such as the cooling section 122 is aligned to the second gap 108 between the two inner shroud segments 104 of the pair 103 of inner shroud segments 104. In this way, the cooling section 122 of the impingement plate 120 allows the cooling fluid (received from the first gap 106) to flow through the plurality of openings 124 with increased velocity towards the second sealing component 112. In some embodiments, the impingement plate 120 includes a metallic material, a ceramic material, a composite material or combinations thereof.

In a typical turbine system, use of inner shroud segments composed of a ceramic matrix composite may enable the turbine system to operate at an elevated temperature (for example, higher than 1200 degrees Celsius). However, use of metallic sealing components between the adjacent inner shroud segments may limit the operation of the turbine systems at the elevated temperatures. Typically, a plurality of outer shroud segments and a plurality of inner shroud segments in a shroud assembly are arranged such as a first gap between a pair of the outer shroud segments and a second gap between a pair of the inner shroud segments are aligned. Embodiments of the present disclosure as described herein, provide an alternative configuration of the shroud assembly where the first gap and the second gap are offset with each other. In these embodiments, the impingement plate is aligned to the second gap or the second sealing component disposed in the second gap. In these configurations, the impingement plate flows cooling fluid towards the second sealing component and improves the cooling of the second sealing component. According, the present disclosure provides improved cooling for the second sealing component. Improved cooling of metallic second sealing components (that are proximate to the hot gas flow path) enables the operation of the turbine systems at an elevated temperature without using an additional cooling fluid flow (or while reducing the requirement of an additional cooling fluid flow). Moreover, a thick metallic shim can be used for the second sealing component with improved cooling.

Figure 4:
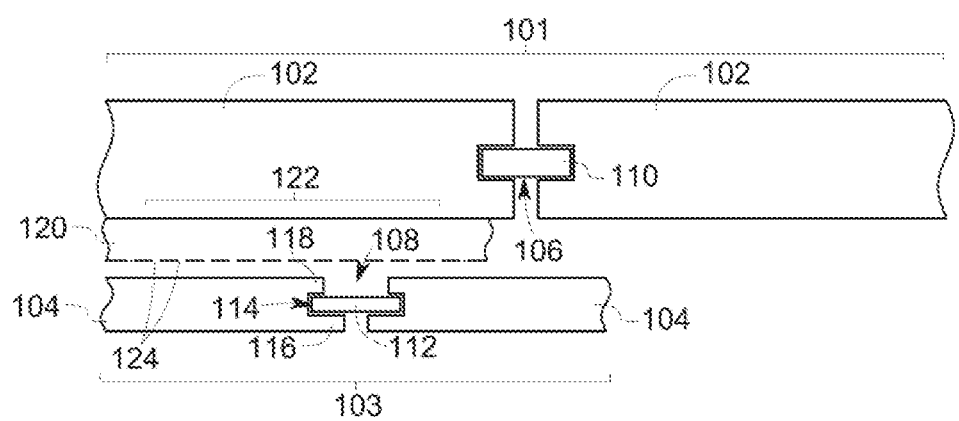
FIG. 4 is a schematic cross-sectional view of a portion of a shroud assembly, in accordance with another embodiment of the disclosure.
Figure 5:
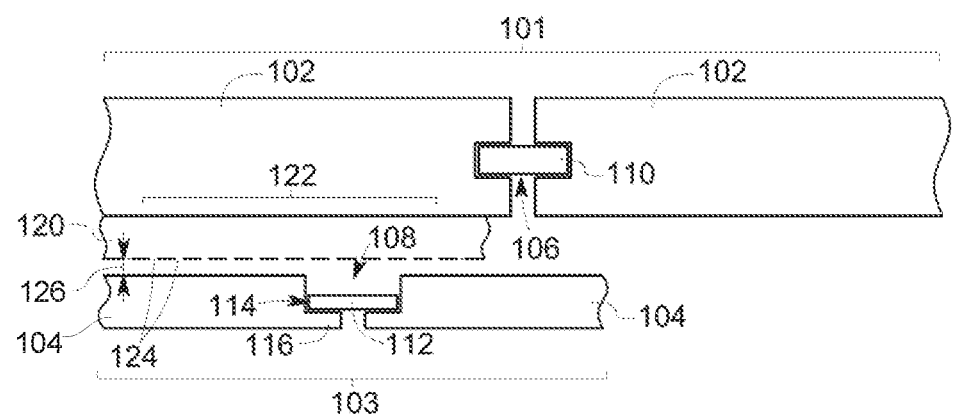
FIG. 5 is a schematic cross-sectional view of a portion of a shroud assembly, in accordance with yet another embodiment of the disclosure.

In some embodiments, as illustrated in FIG. 4, the second leg 118 of each inner shroud segment 104 may be shorter as compared to that of the first leg 116. In some other embodiments, the second legs 118 may not be required and the sealing component 112 disposed in the second gap 108 is supported by the first legs 116 of the adjacent inner shroud segments 104, as shown in FIG. 5. These configurations may allow to expose a higher surface area of the second sealing component 112 to the cooling fluid through the impingement plate 120 for improved cooling as compared to that of the configuration illustrated in FIG. 3.

Further, in embodiments as illustrated in FIG. 5, the second sealing component 112 may have a thickness greater than a space 126 between the impingement plate 120 and the inner shroud segment 104. A thick second sealing component 112 would not fall out of the second gap 108. In some other embodiments, the upper shroud segment 102 or the impingement plate 120 may include one or more protrusions 130 extending towards the second sealing component 112 as shown in FIG. 6. The one or more protrusions 130 may be present at one or more locations throughout the length of the upper shroud segment 102 or the impingement plate 120. These protrusions 130 may provide support to the second sealing component 112 to retain it in the second gap 108 and avoid the second sealing component 112 falling out.

In some embodiments, FIG. 7 illustrates a cross-sectional view of a portion of a shroud assembly 100 (FIG. 2) where the plurality of outer shroud segments 102 (that are arranged adjacent to one another annularly about the axis 60) defines a plurality of first gaps 106 between each pair 101 of the outer shroud segments 102 about the axis 60 (FIG. 2); and the plurality of inner shroud segments 104 arranged adjacent to one another annularly about the axis 60, defines a plurality of second gaps 108 between each pair 103 of the plurality of inner shroud segments 104. Accordingly, the shroud assembly 100 includes the plurality of first gaps 106 and the plurality of second gaps 108. In this configuration, the plurality of first gaps 106 and the plurality of second gaps 108 are offset. In some embodiments, each first gap 106 and each second gap 108 are offset with one another. In other words, none of the first gap 106 is aligned to a second gap 108. In some embodiments, the plurality of inner shroud segments 104 is same in number to the plurality of outer shroud segments 102. Further, the shroud assembly 100 includes a plurality of first sealing components 110 disposed in the plurality of first gaps 106, and a plurality of second sealing components 112 disposed in the plurality of second gaps 108. In some embodiments, the shroud assembly 100 includes a plurality of impingement plates 120 coupled to the plurality of outer shroud segments 102 and interposed between the plurality of outer shroud segments 102 and the plurality of inner shroud segments 104. In some embodiments, one or more impingement plates 120 of the plurality of impingement plates 120 may be coupled to an outer shroud segment 102 of the plurality of shroud segments 102. In some embodiments, each impingement plate 120 of the plurality of impingement plates 120 is aligned to each second gap 108 of the plurality of the second gaps 108. In this configuration, each impingement plate 120 provide the cooling fluid flow towards each correspondingly aligned second sealing component 112, and thereby the configuration improves overall cooling in the shroud assembly 100.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A shroud assembly for a turbine system, comprising:
a plurality of outer shroud segments disposed annularly and defining a first gap between a pair of outer shroud segments of the plurality of outer shroud segments;
a plurality of inner shroud segments disposed annularly and radially inward of the plurality of outer shroud segments, and defining a second gap between a pair of inner shroud segments of the plurality of inner shroud segments, wherein the plurality of inner shroud segments is same in number to the plurality of outer shroud segments, and wherein the first gap and the second gap are offset; and
an impingement plate coupled to an outer shroud segment of the pair of outer shroud segments and interposed between the outer shroud segment and the pair of inner shroud segments, wherein the impingement plate comprises a cooling section having a plurality of openings, and wherein the impingement plate is positioned such that the cooling section is aligned to the second gap.

2. The shroud assembly of claim 1, wherein the plurality of outer shroud segments comprises a ceramic material, a metallic material, a composite material or combinations thereof.

3. The shroud assembly of claim 1, wherein the plurality of inner shroud segments comprises a ceramic material, a metallic material, a composite material or combinations thereof.

4. The shroud assembly of claim 3, wherein the plurality of inner shroud segments comprises a ceramic matrix composite.

5. The shroud assembly of claim 1, wherein a first seal component is disposed in the first gap.

6. The shroud assembly of claim 1, wherein a second seal component is disposed in the second gap.

7. The shroud assembly of claim 6, wherein the second seal component comprises a metallic material.

8. The shroud assembly of claim 6, wherein the second seal component has a thickness in a range of from 0.1 millimeter to 5 millimeters.

9. A shroud assembly for a turbine system, comprising:
a plurality of outer shroud segments disposed annularly and defining a plurality of first gaps between each pair of outer shroud segments of the plurality of outer shroud segments;
a plurality of inner shroud segments disposed annularly and radially inward of the plurality of outer shroud segments, and defining a plurality of second gaps between each pair of inner shroud segments of the plurality of inner shroud segments, wherein the plurality of first gaps and the plurality of second gaps are offset; and
a plurality of impingement plates coupled to the plurality of outer shroud segments and interposed between the plurality of outer shroud segments and the plurality of inner shroud segments, wherein the impingement plate comprises a cooling section having a plurality of openings, and wherein the impingement plate is positioned such that the cooling section is aligned to the second gap.

10. The shroud assembly of claim 9, wherein the plurality of inner shroud segments is same in number to the plurality of outer shroud segments.

* * * * *